United States Patent

[11] 3,526,255

| [72] | Inventors | Paul H. Carter<br>Baltimore, Maryland;<br>Richard D. Collins, Baltimore, Maryland |
|---|---|---|
| [21] | Appl. No. | 795,264 |
| [22] | Filed | Jan. 30, 1969 |
| [73] | Assignee | Maryland Cup Corp.<br>Owings Mills, Maryland<br>a corporation of Maryland |

[54] FILLING MACHINE
11 Claims, 12 Drawing Figs.

[52] U.S. Cl. .................................................. 141/183
[51] Int. Cl. ................................................. B65b 43/42
[50] Field of Search .......................................... 141/183,
182, 191, 193; 107/8.05, 21.1; 251/; 137/

[56] References Cited
UNITED STATES PATENTS

| 660,101 | 10/1900 | Goodlett | 141/183 |
| 1,004,233 | 9/1911 | Bertolott et al | 107/27.1 |
| 2,663,482 | 12/1953 | Gilberty | 141/183 |
| 2,934,872 | 5/1960 | Wise | 141/183 |
| 3,125,134 | 3/1964 | Johnson | 141/183 |
| 3,155,053 | 11/1964 | De Vito et al | 107/8.05 |
| 3,327,651 | 6/1967 | Nielsen | 107/8.05 |

FOREIGN PATENTS

| 1,151,723 | 7/1963 | Germany Sollich | 107/27.1 |

Primary Examiner—Wesley S. Ratliff, Jr.
Attorney—Albert J. Kramer

ABSTRACT: The invention provides a machine for filling ice cream cones with an overflow of semi-fluid ice cream in the manufacture of ice cream novelty items. A conveyor is provided for receiving and carrying the empty cones past an ice cream filling station. The filling station comprises an ice cream valve with a discharge nozzle downwardly directed in line with the cones on the conveyor. Means are provided for reciprocating the valve cyclically both horizontally and vertically. During a portion of the cycle, the valve moves horizontally in unison with the conveyor and also vertically upward from a lowermost position under the control of specially designed cams. During this period of the cycle, the valve is actuated to its open position which causes a cone on the conveyor to first fill and then overfill in accordance with a desired pattern, such as, hemispherical, for example, depending on the vertically controlled movement of the valve.

Patented Sept. 1, 1970

INVENTORS
PAUL H. CARTER
RICHARD D. COLLINS

BY Albert J. Kramer

ATTORNEY

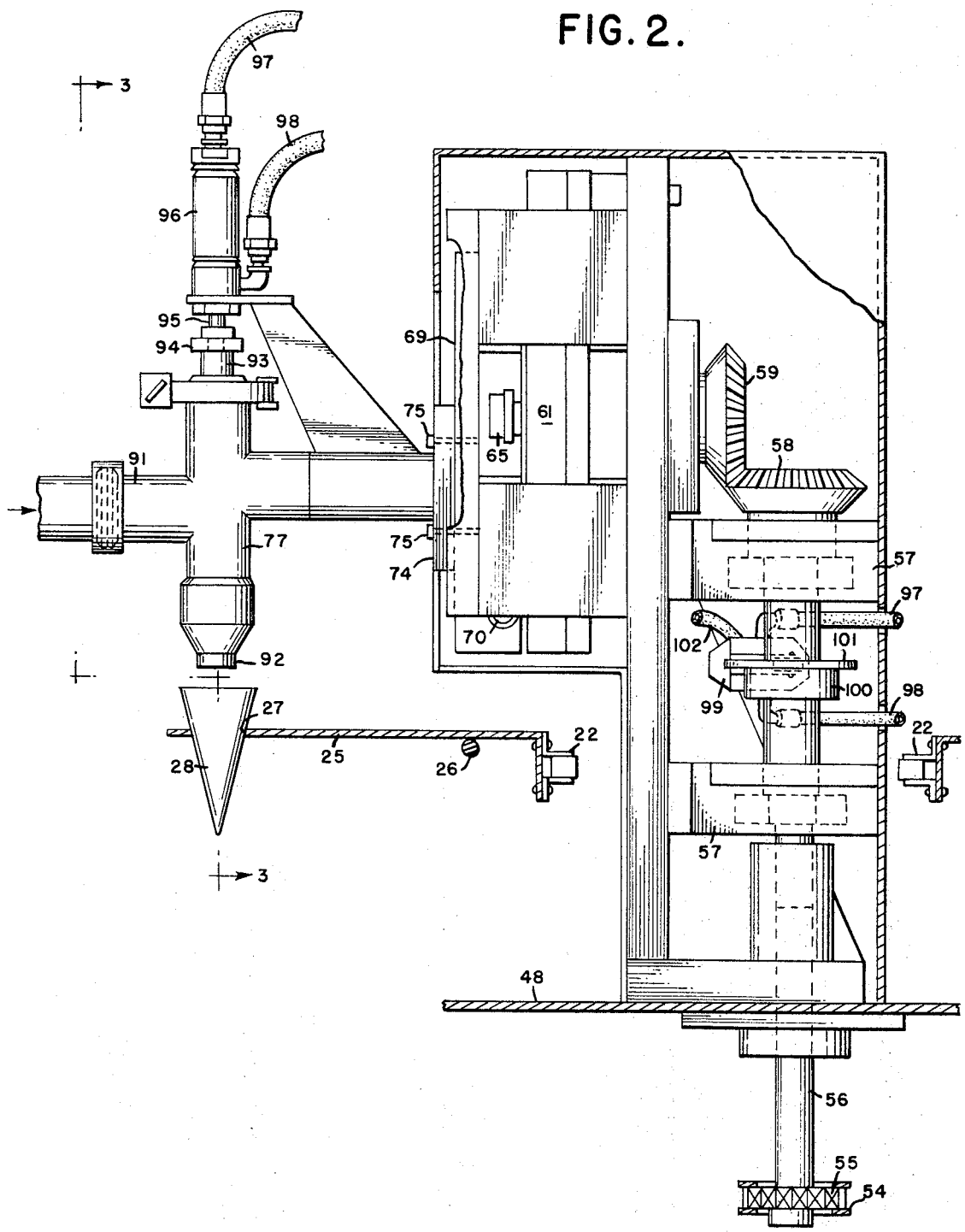

INVENTORS
PAUL H. CARTER
RICHARD D. COLLINS
BY *Albert J. Kramer*
ATTORNEY

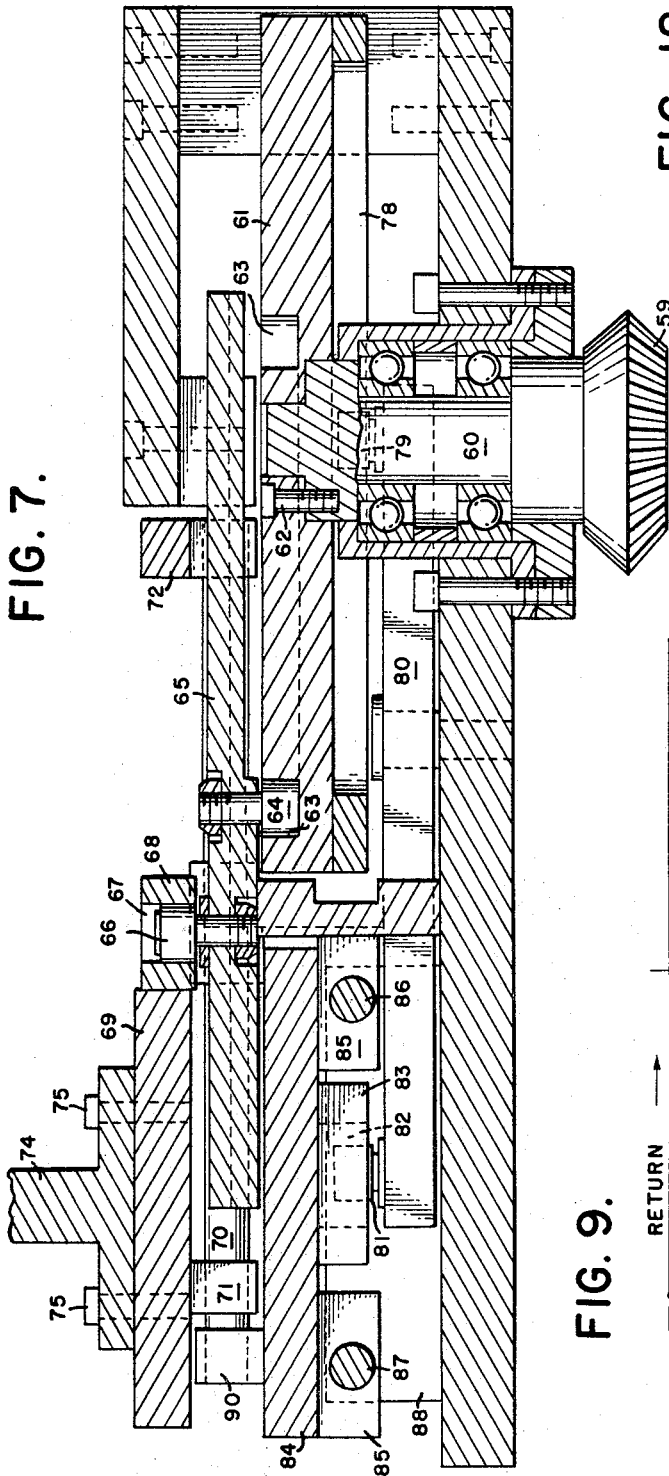
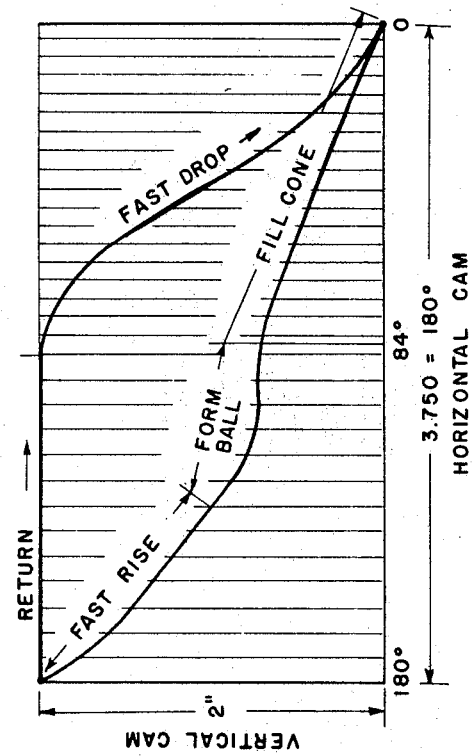
INVENTORS
PAUL H. CARTER
RICHARD D. COLLINS
BY Albert J. Kramer
ATTORNEY FIG. 8.
FIG. 10.
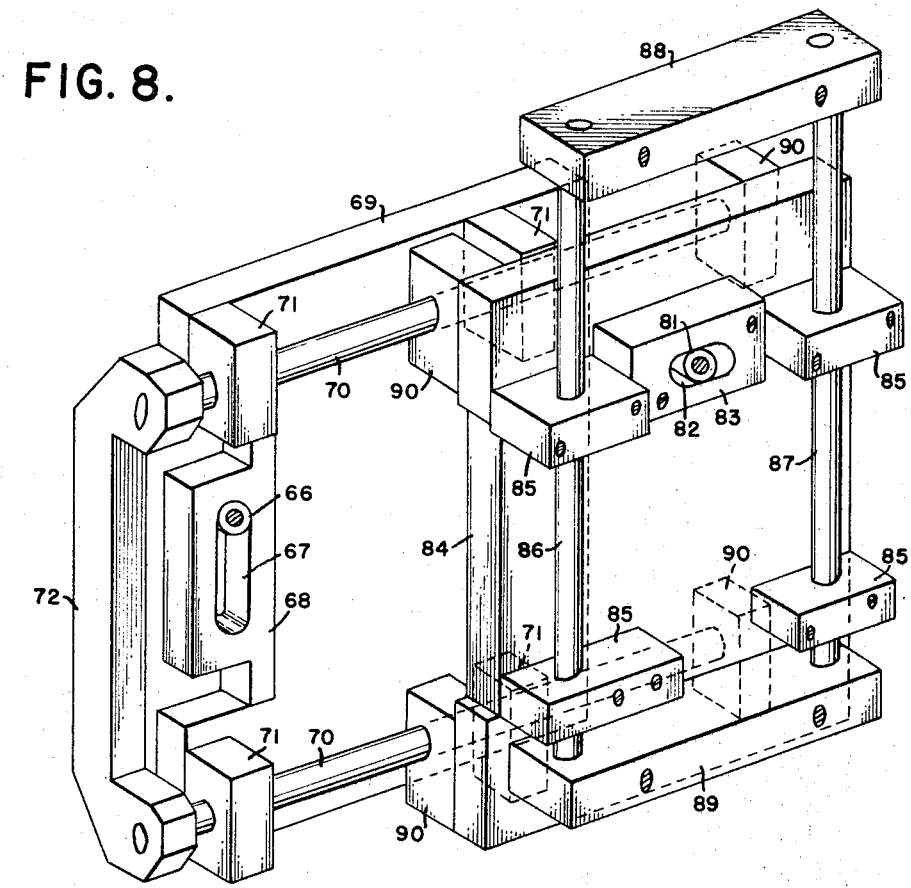
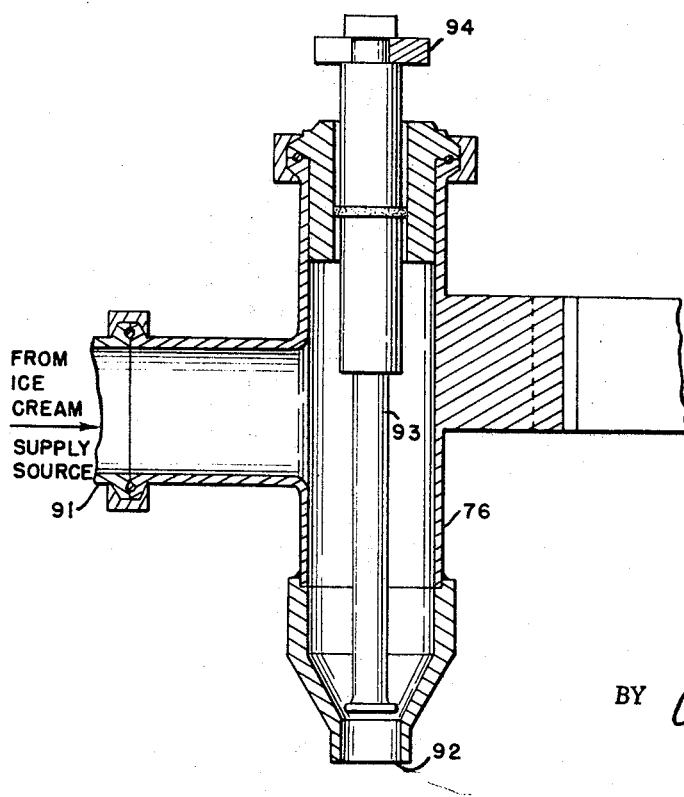
INVENTORS
PAUL H. CARTER
RICHARD D. COLLINS
BY *Albert J. Kramer*
ATTORNEY

FILLING MACHINE

SPECIFICATION

This invention relates to filling machines and it is more particularly concerned with a device for filling ice cream cones with fluid ice cream in the preparation of novelty confectionary items.

An object of the invention is the provision of a machine which fills ice cream cones with fluid ice cream and then continues to feed the ice cream to the filled cones in such a manner as to provide mounds of a desired shape on top of the cones.

Another object is the provision of a machine of the type mentioned, the operation of which can be adjusted to provide mounds of different shapes.

A further object of the invention is the provision of such a machine which comprises modifications of a conventional machine.

A still further object is the provision of such a machine which is reliable, positive in operation, and which is not likely to get out of order.

These and still further objects, advantages and features of the invention will appear more fully from the following description considered together with the accompanying drawing.

In the drawing:

FIG. 2 is a cross sectional view along the line 2—2 of FIG. 1 with the ice cream nozzles in the lower position;

FIG. 7 is a sectional view along the line 7—7 of FIG. 6;

FIG. 8 is a perspective view of the linkage between the cam follower and the nozzles;

FIG. 9 is a graph showing the relationship of movement between the vertical and horizontal cams;

FIG. 10 is a vertical sectional view through the ice cream valve along the line 10—10 of FIG. 3;

FIG. 12 is an enlargement of the clutch and sprocket assembly shown in FIG. 11.

Figure 1:
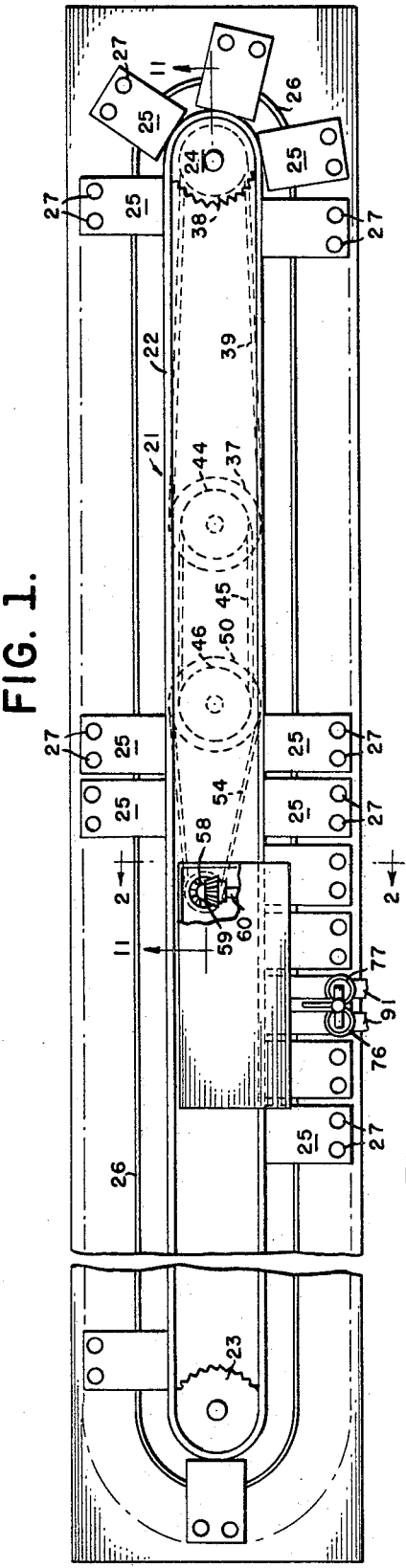
FIG. 1 is a plan view of an embodiment of the invention partly broken away.
Figure 11:
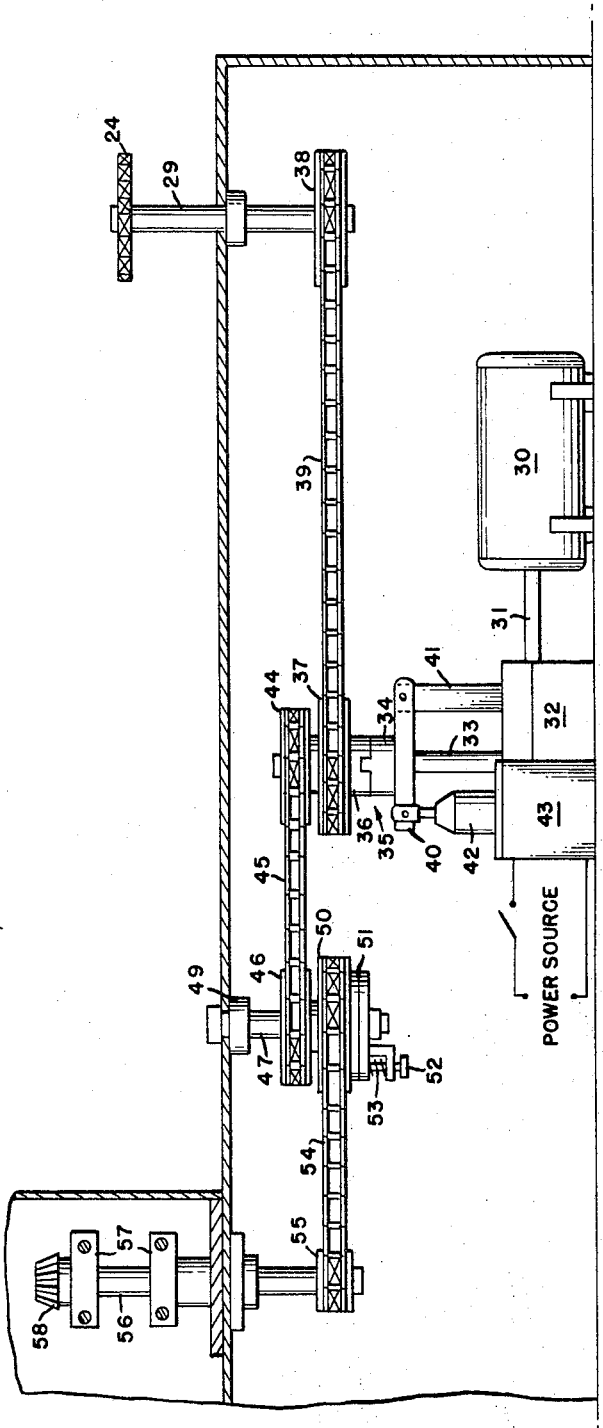
FIG. 11 is a sectional view generally along the line 11—11 of FIG. 1 with parts removed.
Figure 3:
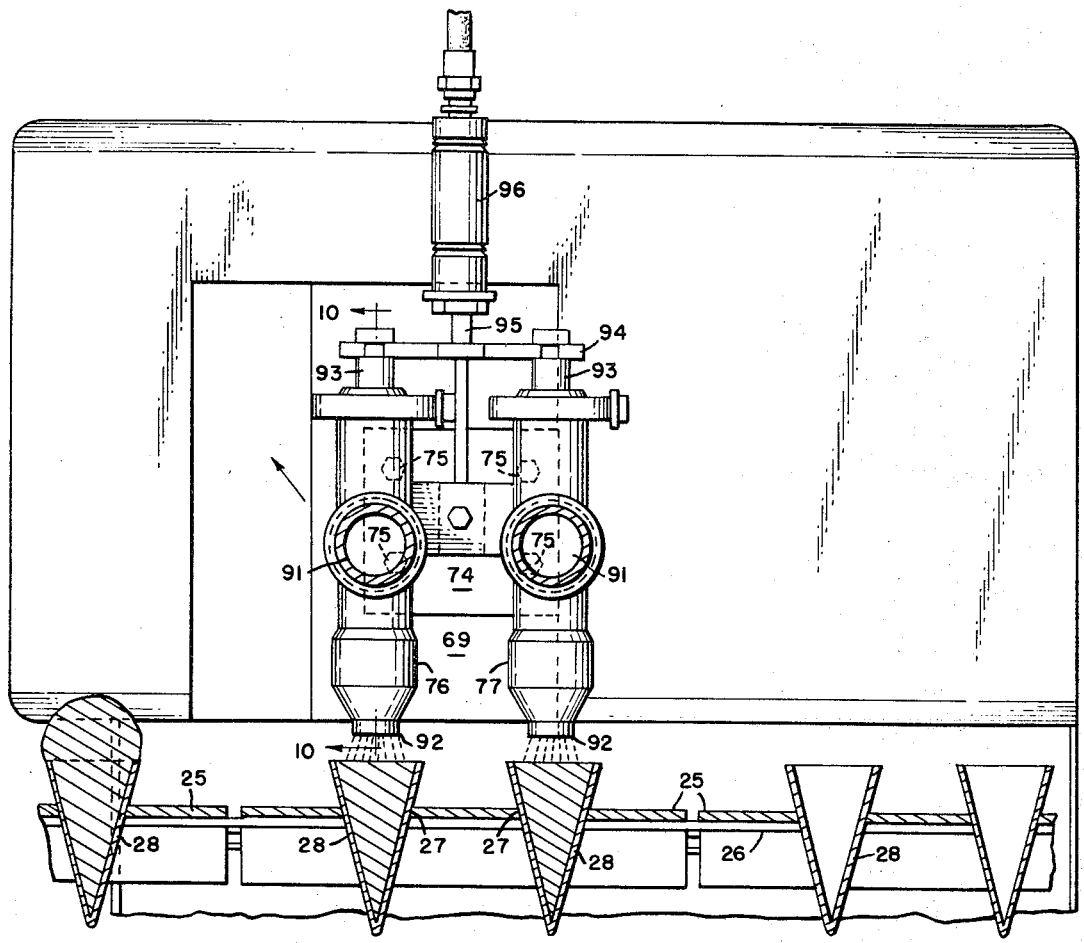
FIG. 3 is a sectional view generally along the line 3—3 of FIG. 2 illustrating the feeding of the ice cream to fill the ice cream cones.
Figure 4:
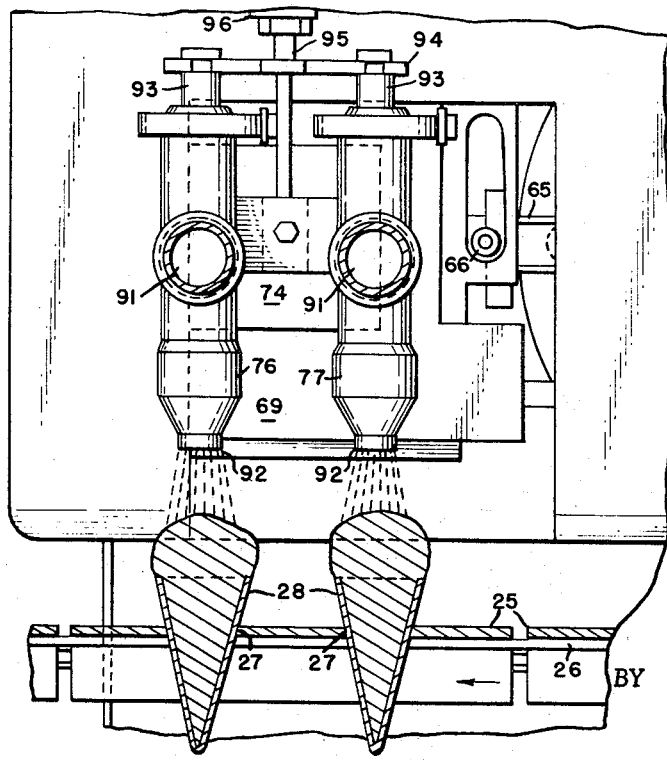
FIG. 4 is a view of a portion of FIG. 3 showing the formation of hemispherical mounds of ice cream as the nozzles are elevated.
Figure 5:
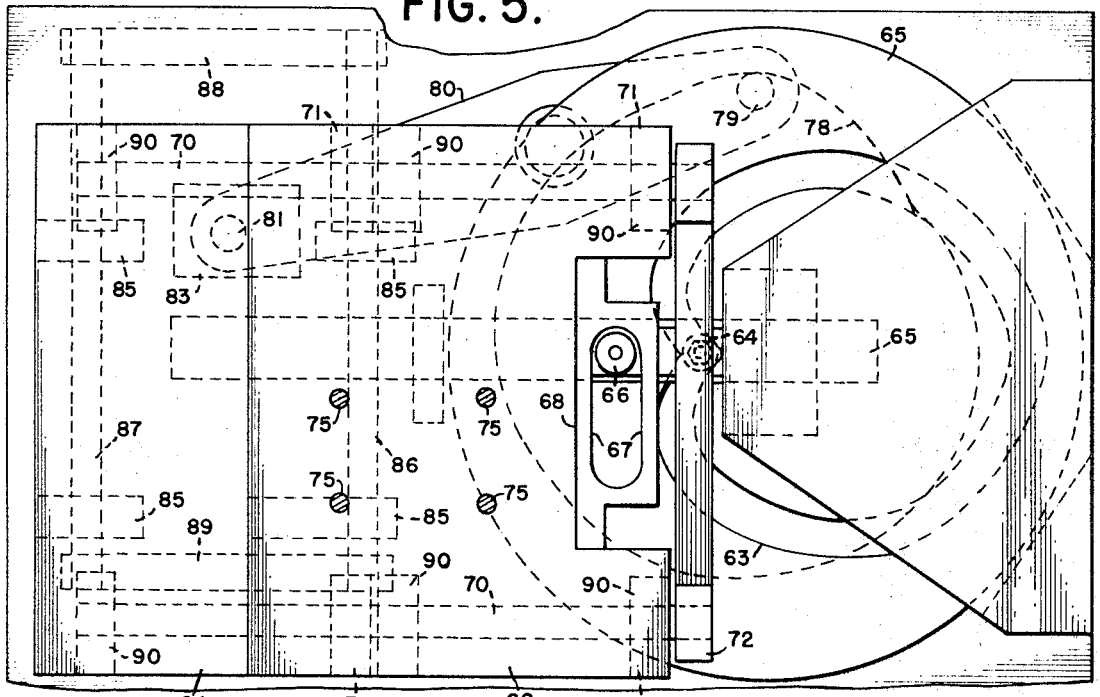
FIGS. 5 and 6 are views of the horizontal and vertical cams and their followers which provide movement of the nozzles to achieve the desired results.
Figure 6:
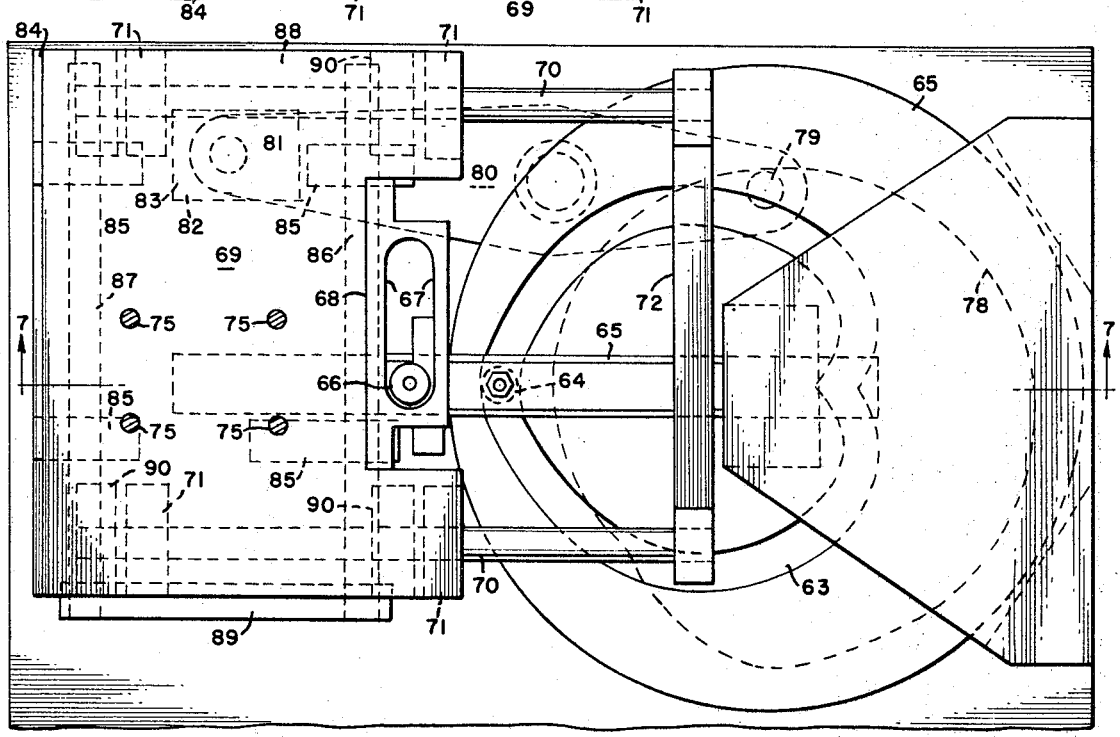

Referring with more particularity to the drawing in which like numerals designate like parts, the embodiment illustrated comprises an elongated horizontal conveyor 21 comprising an endless chain 22 supported by sprockets 23 and 24 at either end. Extending cantileverwise from the chain are a series of horizontal carrier plates 25. A slide bar 26 is disposed to support the plates as they move with the chain 22. Each plate is provided with a pair of apertures 27 for supporting ice cream cones 28.

The conveyor is driven by power delivered to the shaft 29 of sprocket 24 from an electric motor 30. The motor shaft 31 is the input of a transmission 32, the output shaft 33 of which is connected to a shiftable part 34 of a conventional clutch 35. The stationary part 36 of the clutch is connected to a sprocket 37 which is connected to a sprocket 38 on shaft 29 by a chain 39.

The shiftable part 34 of the clutch is carried on a lever 40 fulcrumed to a post 41. The other end is connected to the armature 42 of a solenoid 43 whereby the lever 40 can be moved to either clutch engaging or disengaging position by excitation of the solenoid.

A second sprocket 44 is mounted on the shaft of sprocket 38 for rotation therewith. The sprocket 44 is connected by a chain 45 to a sprocket 46 on a jack shaft 47. The shaft 47 is rotatably mounted on the frame 48 of the device in bearing 49. A sprocket 50 is also rotatably mounted on the shaft 47 together with a clutch disc 51 which is secured to the shaft 47 for rotation therewith. The disc 51 is normally coupled to the sprocket 50 by a pin 52 loaded by a spring 53. Hence, disengagement is readily effected by disengaging the pin 52 from the sprocket against the action of the spring.

The sprocket 50 is connected by a chain 54 to a sprocket 55 on a driven shaft 56. The shaft 56 is mounted in bearings 57 and carries a beveled gear 58. The gear 58 is meshed with a beveled gear 59 on a horizontal shaft 60.

The shaft 60 is connected to a cam plate 61 by means of stud bolts 62 for rotation therewith. The cam plate 61 has a cam track on one side in the form of a groove 63 hereinafter more fully explained which engages a cam roller 64.

The roller 64 is attached to a reciprocating bar 65 which moves under the influence of the cam roller 64. The bar 65 has a second roller 66 which is slidably disposed in a vertical slot 67 of a block 68. The block is secured to a plate 69 mounted on horizontal slide bars 70 by means of lugs 71. The outer ends of the bars 70 are anchored in a block 72. A bracket 74 is secured by bolts 75 to plate 69 and carries a pair of ice cream valves 76, 77.

By these means horizontal movement of the ice cream valves is controlled in relation to the movement of the conveyor and which control will be explained more fully hereinafter.

Vertical movement of the valves 76, 77 is controlled by another cam track 78 on the other side of the cam plate 61 which engages a cam follower in the form of a roller 79. The cam follower 79 is attached to one end of a rocker arm 80. The other end of the rocker arm 80 is attached to a roller 81 which is slidably disposed in a horizontal slot 82 of a block 83.

The block 83 is secured to a plate 84 which is provided with lugs 85 slidably mounted on parallel slide rods 86, 87. The ends of the rods 86, 87 are attached to bars 88, 89 which are secured to the frame of the machine. On the opposite side of the plate, lugs 90 are mounted which support the inner ends of rods 70.

By these means the cam track 78 controls the vertical movement of the ice cream valves in relation to the conveyor 21 while the cam track 63 controls the horizontal movement in relation to the conveyor.

The ice cream valves are of a conventional design having each an ice cream inlet 91, an outlet nozzle 92, and a valve stem 93. The valve stem 93 is connected to a cross bar 94 which in turn is connected to a reciprocating rod 95 of an air motor 96. Air lines 97 and 98 of the air motor control movement of the rod 95 upwardly and downwardly respectively. These air lines are connected to a conventional switch valve 99 having a conventional actuator 100 controlled by a conventional cam 101 on shaft 56. The switch valve 99 is connected to an intake air line 102 from a source of air supply (not shown).

On the forward part of the cycle, the valve stem 93 is in its open or raised position. In the return part of the cycle the valve stem 93 is in its down or closed position. The movement of the valves by the cams control the flow of ice cream to the ice cream cone. See FIG. 9.

We claim:

1. A machine for filling ice cream cones comprising a conveyor for supporting and carrying the cones in an upright position, a valve for controlling the flow of ice cream in a semifluid state to the ice cream cones from a source of supply, said valve being disposed at a station above the conveyor and having a downwardly directed discharge nozzle, means for reciprocating the valve at the station vertically and horizontally and means for opening and closing the valve to modulate the flow of ice cream from the nozzle cyclically to fill a cone with an overflow mound of the ice cream superimposed thereon.

2. A machine as defined by claim 1 in which the first mentioned means comprises a cam and a linkage between the cam and valve for reciprocating the valve horizontally.

3. A machine as defined by claim 1 in which the first mentioned means comprises a cam and a linkage between the cam and valve for reciprocating the valve vertically.

4. A machine as defined by claim 1 in which the means comprises cams and linkages between the cams and valve for reciprocating the valve horizontally and vertically.

5. A machine as defined by claim 1 in which the latter means comprises an air motor having a reciprocating stem connected to the valve, said air motor having air tubes for actuating it in opposite directions, an air switch connected to said tubes and to a source of air under pressure, and means for actuating said switch in relation to said first mentioned means.

6. A machine as defined by claim 4 in which the linkages comprise cam followers engaging said cams, respectively, one of said cam followers being connected to a rocker arm and another being connected to a push bar, said push bar and rocker arm being each connected to a separate plate, said plates being connected together for relative slidable movement horizontally and vertically, said valve being connected to one of said plates.

7. A machine as defined by claim 6 in which the plates are connected together by means of orthogonally disposed slide rods and lugs mounted on the rods.

8. A machine as defined by claim 1 and a source of power, a gear train connected to the source of power for driving the conveyor and for simultaneously reciprocating the valve.

9. A machine as defined by claim 8 and a clutch means for disengaging the source of power from the gear train.

10. A machine as defined by claim 8 and clutch means for disengaging the source of power from the valve reciprocating means, independently of the conveyor.

11. A machine as defined by claim 4 in which the cams are disposed on opposite sides of a rotating plate.